US006555036B1

(12) United States Patent
Brennan et al.

(10) Patent No.: US 6,555,036 B1
(45) Date of Patent: Apr. 29, 2003

(54) CONTROL OF COMBUSTIBLES DURING FIRING

(75) Inventors: John H. Brennan, Horseheads, NY (US); Tudor C. Gheorghiu, Painted Post, NY (US); Mark A. Spetseris, Pine City, NY (US)

(73) Assignee: Corning Incorporated, Corning, NY (US)

( * ) Notice: Subject to any disclaimer, the term of this patent is extended or adjusted under 35 U.S.C. 154(b) by 40 days.

(21) Appl. No.: 10/047,492

(22) Filed: Oct. 26, 2001

(51) Int. Cl.[7] ................................................ C04B 33/32
(52) U.S. Cl. ....................... 264/40.1; 264/656; 264/657
(58) Field of Search ................................ 264/40.1, 656, 264/657

(56) References Cited

U.S. PATENT DOCUMENTS 4,719,073 A * 1/1988 Langan
5,271,877 A * 12/1993 Matsumae et al.
5,868,977 A * 2/1999 Ito et al.

* cited by examiner

*Primary Examiner*—Christopher A. Fiorilla
(74) *Attorney, Agent, or Firm*—Anca C. Gheorghiu

(57) ABSTRACT

A process for automatically controlling combustible vapors during debinding and firing of ceramic products which includes establishing a maximum percentage of lower flammability limit (LFL) setpoint no greater than 50%; measuring continuously the percentage of LFL in the kiln atmosphere; and, maintaining the measured percentage of LFL to be less than or equal to the maximum percentage of LFL setpoint by an action selected from the group consisting of increasing gas volume delivered to the kiln, decreasing $O_2$ concentration in the kiln, decreasing heating rate in the firing cycle, and combinations thereof.

7 Claims, 2 Drawing Sheets

CONTROL OF COMBUSTIBLES DURING FIRING

BACKGROUND OF THE INVENTION

The present invention relates to a process for automatically controlling the combustible concentration during firing of ceramic products. In particular, the invention relates to a process for maintaining an acceptable percentage of the lower flammability limit (LFL) during organic additives burnout region in ceramic products.

During firing of ceramic products organic additives vaporize into the kiln atmosphere. These vapors include hydrogen and carbon monoxide, which are combustible and can become flammable leading to dangerous conditions during processing.

The National Fire Protection Agency (NFPA) requires manufacturers of ceramic products with organic additive systems to maintain kiln atmospheres at specific levels of volatile organic compounds to prevent uncontrolled combustion, deflagration or detonation. The minimum concentration of volatile combustibles in which a flame can be propagated is known as the Lower Flammability Limit or LFL (also referred to as "Lower Explosive Limit", LEL) and has units of percentage. In particular a LFL level of 70% means that the atmosphere contains a combustible volatile compound or mixture of combustible volatile compounds in a concentration equal to 70% of the composite Lower Flammability Limit of the mixture. At 100% LFL the atmosphere can sustain and propagate a flame.

SUMMARY OF THE INVENTION

Accordingly it is an object of this invention to provide a process of, efficiently and effectively controlling the flammable or combustible concentrations in a kiln atmosphere during firing of ceramic products containing organic additive systems.

The process of the present invention comprises establishing a maximum percentage of the lower-flammability limit (LFL) setpoint no greater than 50%; measuring continuously the percentage of LFL in the kiln atmosphere; and, maintaining the measured percentage of LFL to be less than or equal to the maximum percentage of LFL setpoint by an action selected from the group consisting of increasing gas volume delivered to the kiln, decreasing $O_2$ concentration in the kiln, decreasing heating rate in the firing cycle, and combinations thereof.

Preferably the maximum percentage of LFL setpoint is no greater than 30%–40%.

DETAILED DESCRIPTION OF THE INVENTION

Figure 1:
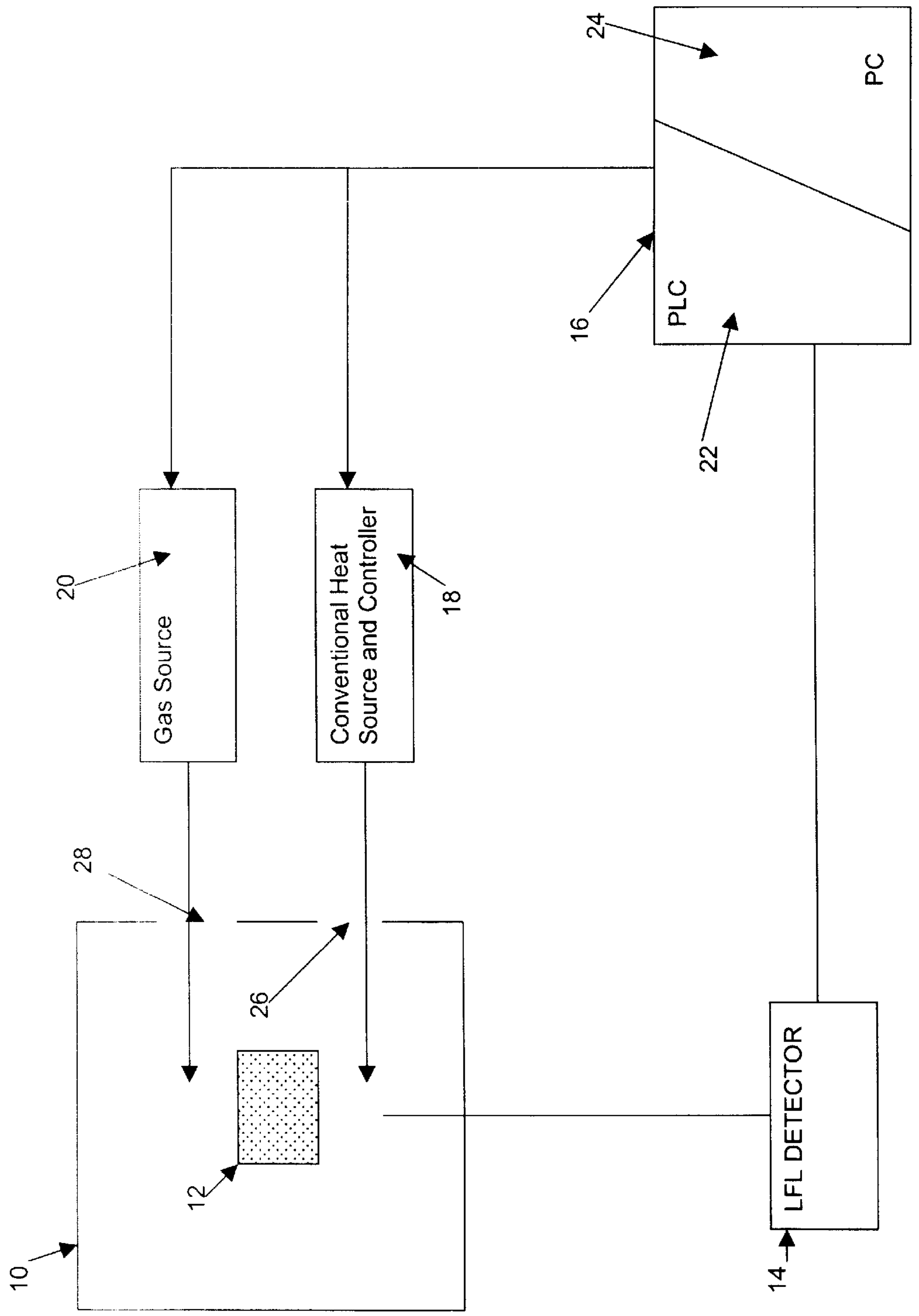
FIG. 1 is a block diagram of an apparatus illustrating a preferred embodiment of a basic system useful in carrying out the process of the present invention.

Referring to FIG. 1 therein illustrated is a preferred embodiment of a basic system for automatically controlling the flammable or combustible concentrations in a kiln's atmosphere during firing of ceramic products containing organic additives release according to the process described herein. This system comprises a heating unit or kiln 10 within which is located a ceramic article 12 to be debound of organic content and sintered. The system further includes a lower flammability limit (LFL) detector device 14 for continuously measuring and monitoring the LFL level in kiln 10. LFL detector device 14 is coupled to control unit 16, that independently controls a conventional heat source 18, and a gas source 20.

Control unit 16 preferably comprises a combination programmable logic controller (PLC) 22 and a personal computer (PC) 24. LFL detector device 14 is preferably one manufactured by Control Instruments Corporation (Fairfield, N.J.), most preferably Model 670 Series LFL Detector. Heat source 18 may comprise convective, conductive, or radiant heat, including, but not limited to electric resistance, microwave, gas heating or a combination of these. Combustion air from the heat source 18 is introduced into kiln 10 at primary nozzle 26. Although the described preferred embodiment is directed to a fuel or direct fired kiln, the invention is nonetheless equally applicable to other kilns such as electric kilns and microwave-assisted kilns.

Secondary nozzle 28 is the introduction site for gas source 20. Suitable gas sources in the present invention include secondary gas comprising recirculated product of combustion (i.e., vapors of water, nitrogen ($N_2$) gas and carbon dioxide ($CO_2$) gas), nitrogen ($N_2$) gas and air; any inert or noble gas such as helium, neon and argon, and any gas: containing a low level of oxygen ($O_2$) such as $N_2$ gas and $CO_2$ gas.

In operation, a maximum percentage of LFL setpoint no greater than 50%, preferably no greater than 30–40%, is established for temperature ranges which encompass organic additives release. For a cordierite containing ceramic product, such as commercially available catalytic converters, typically, the organic release temperature range is between about 100° C.–600° C. in the presence of organic binders, such as methylcellulose . The temperature range of the release region can be increased or decreased depending on the type of ceramic product to be fired; for example, if the cordierite ceramic catalytic converter contains graphite in addition to an organic binder the temperature range of the release region would be increased up to about 1000° C.

Cordierite ceramic articles are disclosed here by way of example, however it should be noted that the invention disclosed herein is acceptable for use with any composition of ceramic article in addition to cordierite, including but not limited to aluminum titanate ceramics, alumina bricks, zirconia refractory bodies, and high alumina ceramic insulators. In other words the present method of control is suitable for any inorganic ceramic bodies that exhibit a region of carbonaceous material release during firing.

Based on the above characteristics, it is contemplated that the method of control is designed whereby the maximum percentage of LFL setpoint for a time-temperature profile is programmed into the PLC, so as to provide for the condition wherein the measured percentage of LFL is equal to or less than the maximum percentage of LFL setpoint. For purposes of the present description "measured percentage of LFL" refers to the percentage of LFL level or combustible concentration registered on the LFL detector device in the kiln's atmosphere. Specifically, during heating of the ceramic article, the percentage of LFL is continuously measured. If the maximum percentage of LFL setpoint is surpassed at any given point in the time-temperature curve, an action selected from the group consisting of increasing gas volume delivered to the kiln, decreasing $O_2$ concentration in the kiln, decreasing heating rate in the firing cycle, and combinations thereof, is automatically initiated by control unit 16 to attain the stated condition.

Therefore, the volume of gas delivered to the kiln, the heating rate, and the $O_2$ concentration are automatically adjusted in response to the comparison between the measured percentage of LFL and the maximum percentage of LFL setpoint conducted by control unit 16. Specifically, it has been found that the concentration of combustibles in the kiln, and therefore the percentage of LFL, may be lowered by increasing the volume of gas introduced in the atmosphere of the kiln, decreasing the heating rate of the cycle, decreasing the $O_2$ concentration in the kiln's atmosphere or a combination thereof. In the invention a suitable method of decreasing the $O_2$ concentration in the kiln's atmosphere is through the introduction into the kiln of an low $O_2$, preferably nitrogen ($N_2$) or carbon dioxide ($CO_2$) which replaces $O_2$. For purposes of the present invention "decreasing the heating rate in the firing cycle" not only refers to a slowing down in the heating rate, such as from 50° C./hr. to 45° C./hr., but also to a hold period for a given temperature or during a temperature range, such as a hold of 3 hours at 450° C., and further to a negative rate such as −30° C./hr, which in effect means a cooling period.

In a preferred embodiment the percentage of LFL is lowered by first increasing a volume of secondary gas, then decreasing the $O_2$ concentration in the kiln atmosphere by introducing a gas selected from the group consisting of $N_2$ and $CO_2$, and then decreasing the heating rate of the firing cycle. It must be noted that each action is automatically triggered if the measured percentage of LFL is not less than or equal to the maximum percentage of LFL setpoint. Ultimately, if these actions fail to reduce the percentage of LFL to below 50%, the kiln is programmed to attain a controlled cycle shutdown to avoid dangerous and excessive percentage of LFL conditions, which may lead to uncontrolled combustion, deflagration or detonation.

EXAMPLE

Figure 2:
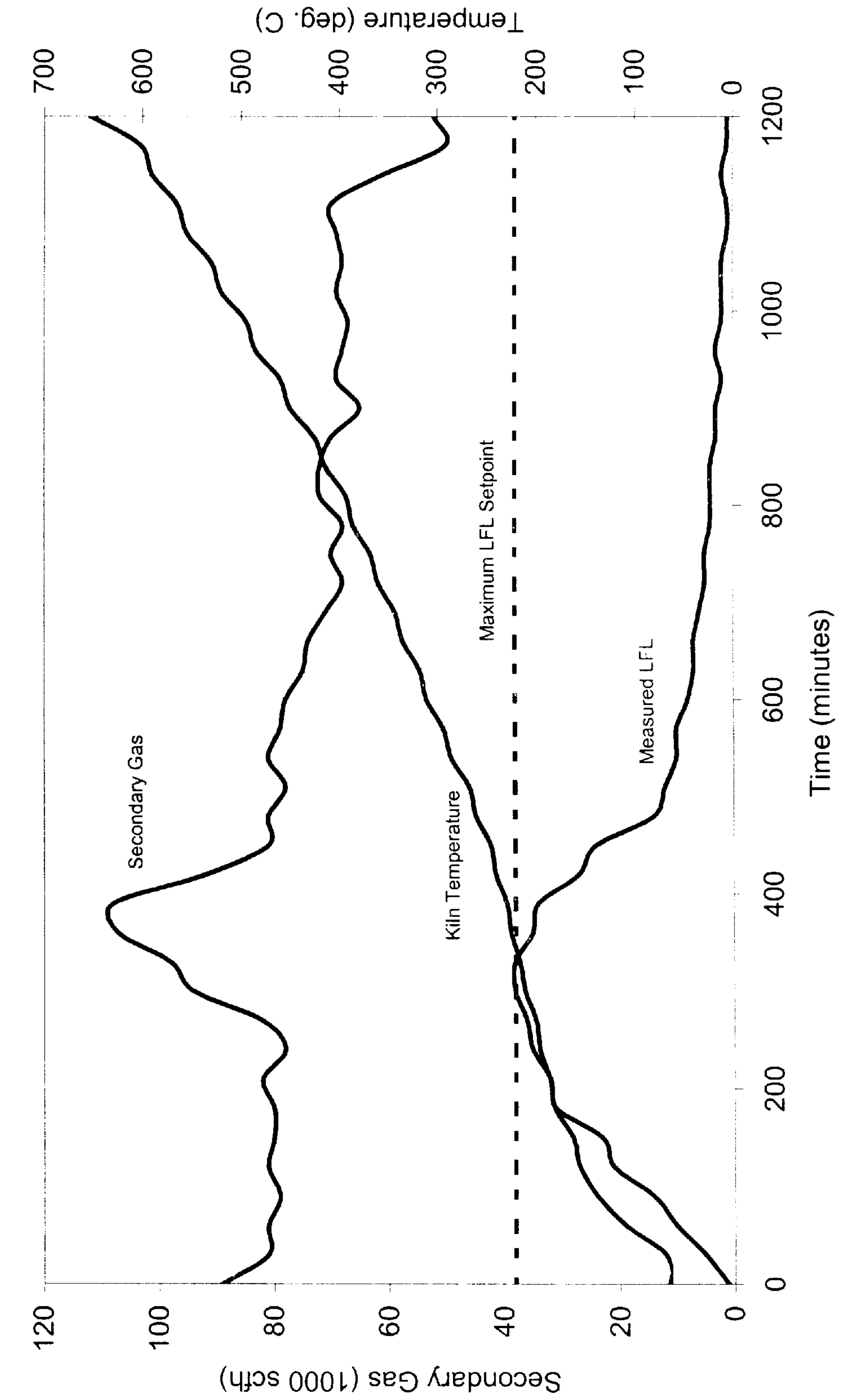
FIG. 2 is a graph illustrating the effect of gas flow volume on the measured percentage of LFL during firing of ceramic bodies according to the present invention.

The accompanying Table presents an example showing controlling the percentage of LFL through an increase in the volume of secondary gas delivered to the kiln according to the inventive process. Listed in the Table are column for Time (hrs.), Temperature (° C.), Maximum percentage of LFL setpoint (%), Measured percentage of LFL (%) and Secondary Gas (scfh). FIG. 2 is an illustrated version of the data provided in the Table.

The maximum percentage of LFL setpoint for the example is established at about 38%, and it is kept at this level at each time-temperature point; it must be noted however that the maximum percentage of LFL setpoint need not be a constant value at each time-temperature point and can be varied. The organics release region is between about 150° C. and 450° C. During this region the measured percentage of LFL increases but does not surpass about 38% because the kiln automatically increases the volume of secondary gas delivered in the same temperature region, as shown in the graph. The effect then is to maintain the percentage of LFL at the maximum percentage of LFL setpoint until the organic additives are evolved from the ceramic article. The kiln did not trigger any additional actions (i.e., decreasing the concentration of $O_2$ and/or decreasing the firing heating rate) because the increase in secondary gas flow was sufficient to control the percentage of LFL in the kiln within the established maximum percentage of LFL setpoint. Nonetheless, it is contemplated that in certain situations an increase in the volume of secondary gas delivered to the kiln may not be sufficient to control the percentage of LFL in the kiln's atmosphere and additionally a decrease in the concentration of $O_2$ and/or a decrease in the firing heating rate may be necessary, initiated by reaching higher percentage of LFL measurements.

It should be noted that although the process of the instant invention is most suitable for firing temperature ranges during which the ceramic body exhibits organic additive burhout, it can be used during any temperature range during the firing cycle which is determined to carry Measurable quantities of combustibles.

TABLE

| Time (minutes) | Temperature (° C.) | Maximum Percentage of LFL Setpoint (%) | Measured Percentage of LFL (%) | Secondary Gas (1000 scfh) |
|---|---|---|---|---|
| 0 | 66 | 38 | 1 | 89 |
| 30 | 70 | 38 | 5 | 81 |
| 60 | 110 | 38 | 10 | 81 |
| 90 | 139 | 38 | 14 | 79 |
| 120 | 157 | 38 | 21 | 81 |
| 150 | 164 | 38 | 23 | 80 |
| 180 | 182 | 38 | 31 | 80 |
| 210 | 187 | 38 | 32 | 82 |
| 240 | 197 | 38 | 35 | 78 |
| 270 | 201 | 38 | 36 | 82 |
| 300 | 212 | 38 | 38 | 94 |
| 330 | 217 | 38 | 38 | 98 |
| 360 | 226 | 38 | 35 | 107 |
| 390 | 230 | 38 | 34 | 108 |
| 420 | 241 | 38 | 27 | 92 |
| 450 | 246 | 38 | 24 | 81 |
| 480 | 261 | 38 | 14 | 81 |
| 510 | 268 | 38 | 12 | 78 |
| 540 | 286 | 38 | 10 | 81 |
| 570 | 294 | 38 | 10 | 79 |
| 600 | 311 | 38 | 8 | 78 |
| 630 | 318 | 38 | 7 | 75 |
| 660 | 335 | 38 | 7 | 74 |
| 690 | 343 | 38 | 6 | 71 |
| 720 | 360 | 38 | 5 | 68 |
| 750 | 368 | 38 | 5 | 70 |
| 780 | 386 | 38 | 4 | 68 |
| 810 | 393 | 38 | 4 | 72 |
| 840 | 414 | 38 | 4 | 72 |
| 870 | 425 | 38 | 3 | 70 |
| 900 | 450 | 38 | 3 | 65 |
| 930 | 460 | 38 | 2 | 69 |
| 960 | 485 | 38 | 3 | 68 |
| 990 | 495 | 38 | 2 | 67 |
| 1020 | 520 | 38 | 2 | 69 |
| 1050 | 530 | 38 | 2 | 68 |
| 1080 | 555 | 38 | 1 | 69 |
| 1110 | 565 | 38 | 1 | 70 |
| 1140 | 590 | 38 | 2 | 61 |
| 1170 | 602 | 38 | 1 | 50 |
| 1200 | 652 | 38 | 1 | 52 |

It is claimed:

1. A process for automatically controlling flammable concentrations in a kiln during firing of ceramic products, the method comprising:

a. establishing a maximum percentage of LFL setpoint no greater than 50%;

b. measuring continuously percentage of LFL in the kiln; and, c. maintaining the measured percentage of LFL to be less than or equal to the maximum percentage of LFL setpoint by an action selected from the group consisting of increasing gas volume delivered to the kiln, decreasing $O_2$ concentration in the kiln, decreasing heating rate in the firing cycle, and combinations thereof.

2. A process according to claim 1 wherein the maximum percentage of LFL setpoint is no greater than 30–40%.

3. A process according to claim 1 wherein the action for maintaining the measured percentage of LFL to be less than or equal to the maximum percentage of LFL setpoint is increasing gas volume delivered to the kiln.

4. A process according to claim 3 wherein the gas is secondary gas comprising recirculated, product of combustion (i.e., vapors of water, nitrogen ($N_2$) gas and carbon dioxide ($CO_2$) gas), nitrogen ($N_2$) gas and air.

5. A process according to claim 4 wherein the action for maintaining the measured percentage of LFL to be less than or equal to the maximum percentage of LFL setpoint is a combination of increasing secondary gas volume delivered to the kiln, decreasing $O_2$ concentration in the kiln, and decreasing heating rate in the firing cycle.

6. A process according to claim 2 wherein the measured percentage of LFL is maintained to be less than or equal to the maximum percentage of LFL setpoint between a temperature range of 100° C.–100° C.

7. A process according to claim 5 wherein the temperature range is between 100° C.–600° C.

* * * * *

UNITED STATES PATENT AND TRADEMARK OFFICE

CERTIFICATE OF CORRECTION

PATENT NO. : 6,555,036 B1

DATED : April 29, 2003

INVENTOR(S) : Brennan et al.

It is certified that error appears in the above-identified patent and that said Letters Patent is hereby corrected as shown below:

Column 6,

Line 10, "100ºC-100ºC" should be -- 100ºC−1000ºC --.

Signed and Sealed this

Twenty-fifth Day of November, 2003

JAMES E. ROGAN

*Director of the United States Patent and Trademark Office*